(12) United States Patent
Loeffler et al.

(10) Patent No.: US 6,575,871 B2
(45) Date of Patent: Jun. 10, 2003

(54) ARRANGEMENT AND METHOD FOR CONTROLLING AN ADJUSTING SPEED OF A SHIFT OPERATION IN A CONTINUOUSLY VARIABLE TRANSMISSION

(75) Inventors: Juergen Loeffler, Ludwigsburg; Martin-Peter Bolz, Buehl, both of (DE); Karl-Heinz Senger, Farmington Hills, MI (US); Holger Huelser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 09/750,684

(22) Filed: Jan. 2, 2001

(65) Prior Publication Data

US 2001/0007843 A1 Jul. 12, 2001

(30) Foreign Application Priority Data

Dec. 30, 1999 (DE) .......................... 199 63 783

(51) Int. Cl.[7] .............................................. F16H 61/08
(52) U.S. Cl. ....................................................... 477/37
(58) Field of Search ............................. 477/37, 44, 46; 701/51, 55, 58, 61

(56) References Cited

U.S. PATENT DOCUMENTS

| | | |
|---|---|---|
| 5,337,628 A | 8/1994 | Hendriks et al. |
| 5,514,050 A | 5/1996 | Bäuerle et al. |
| 5,860,891 A | 1/1999 | Bäuerle |

*Primary Examiner*—Charles A. Marmor
*Assistant Examiner*—Ankur Parekh
(74) *Attorney, Agent, or Firm*—Walter Ottesen

(57) ABSTRACT

The invention relates to an arrangement and a method for controlling an adjusting speed for a change of an actual transmission ratio into a steady-state desired transmission ratio (shifting operation) for a continuously variable transmission mounted in the drive train of a motor vehicle. In the arrangement of the invention, it is provided that the shifting operation is subdivided into individual periods (dT) of fixed duration. During each period (dT), a dynamic desired transmission ratio ($u_{dyn}$) is determined by multiplying the steady-state desired transmission ratio ($u_{stat}$) by a gradient ($u_{dot}$). The change of the actual transmission ratio (u) into a dynamic desired transmission ratio ($u_{dyn}$) of each period (dT) takes place with a constant adjusting speed ($v_u$).

13 Claims, 2 Drawing Sheets

ARRANGEMENT AND METHOD FOR CONTROLLING AN ADJUSTING SPEED OF A SHIFT OPERATION IN A CONTINUOUSLY VARIABLE TRANSMISSION

BACKGROUND OF THE INVENTION

Continuously variable transmissions are disclosed, for example, in U.S. Pat. Nos. 5,337,628 and 5,514,050. The transmission is mounted in a drive train of a motor vehicle and transfers a torque, which is generated by a drive unit (motor), corresponding to an actual transmission ratio as a drive torque to the vehicle wheels. The actual transmission ratio is usually determined, controlled by a characteristic field, in dependence upon the following: the operating parameters of equipment arranged in the drive train, a driving situation, a driver command and other quantities. Likewise, numerous methods are known with which a steady-state desired transmission ratio is determined. The desired transmission ratio is to be newly adjusted as a consequence of a change of the driving situation or of a change of a drive command, that is, of the operating parameters. A change from the actual transmission ratio into the steady-state desired transmission ratio (shifting operation) takes place-in-correspondence to a pregiven adjusting speed.

A system is known from U.S. Pat. No. 5,860,891 with which the adjusting speed is controlled during the shift operation in dependence upon selected operating parameters. An influence on the operating parameters takes place indirectly by fixing filter parameters with the aid of which a trace of the transmission ratio adjustment and therefore the adjusting speed is fixed. It is a disadvantage of such a procedure that, in specific operating situations (for example, in an intense change of the accelerator pedal position), an exponential change of the transmission ratio results during the shift operation which can be perceived by the driver as being uncomfortable.

SUMMARY OF THE INVENTION

It is an object of the invention to provide an arrangement and a method for controlling the adjusting speed during a shift operation in a continuously variable transmission.

The arrangement of the invention is for controlling an adjusting speed for a change of an actual transmission ratio (u) into a steady-state desired transmission ratio ($u_{stat}$) (shift operation) for a continuously variable transmission. The arrangement includes: means functioning to do the following: subdivide the shift operation into individual periods (dT) of fixed duration; during each period (dT), determine a dynamic desired transmission ratio ($u_{dyn}$) by multiplying the steady-state desired transmission ratio ($u_{stat}$) by a gradient ($u_{dot}$); and, cause the change from the actual transmission ratio (u) to the dynamic desired transmission ratio ($u_{dyn}$) to take place at a constant adjusting speed ($v_u$) during each period (dT).

The arrangement of the invention includes means with which the above-mentioned method can be carried out. Accordingly, a control apparatus is especially provided wherein a procedure is stored in digitalized form. This procedure makes possible the determination of the adjusting speed according to the invention. The control apparatus can be integrated into an engine control apparatus already available.

Furthermore, it is advantageous to fix the gradient in dependence upon operating parameters of the motor vehicle and its equipment (influence quantities). The influence quantities can, for example, be a position or a change of the position of an accelerator pedal, an instantaneous total running resistance, a position of a brake pedal, the actual transmission ratio, an engine rpm, a difference between the dynamic transmission ratio and the steady-state transmission ratio or also a driver characteristic. The influence quantities can be used individually or can be used in suitable combination to input the gradient. It is also conceivable to fix the determination of the gradient in dependence upon a switching direction (upshifting or downshifting).

The influence of the position and the change of the position of the accelerator pedal can be configured in such a manner especially advantageously that the gradient, and thereafter the adjusting speed, is significantly increased for a high pedal position and especially for a kickdown. Such a procedure can especially be made dependent upon an actuation of a kickdown switch. One can proceed in the same manner when there is a large change of the accelerator pedal position in a positive direction.

The influence of the total running resistance on the gradient can be increased in an advantageous manner, for example, as a consequence of uphill travel or downhill travel with a total driving resistance which deviates greatly from the total driving resistance in the plane. Furthermore, it is advantageous, for an activated brake, to permit no transmission ratio adjustment in a negative direction so that, for a renewed acceleration by the driver of the vehicle, one can proceed from an undiminished high actual transmission ratio.

Furthermore, it is advantageous to configure the influence of the difference between the dynamic transmission ratio and the steady-state transmission ratio for small differences in such a manner that the gradient likewise becomes small so that the shift operation can also still be acceptable at the end thereof, that is, can take place free of a jolt. The actual transmission ratio can advantageously be used for weighting the gradient because, in this way, a dependency between engine rpm and actual transmission ratio can be eliminated therefrom. In a timely manner in advance of reaching a maximum engine rpm of the drive unit, the transmission ratio adjustment in a positive direction must be reversed into a transmission ratio adjustment in the negative direction. However, the transmission is a sluggish system and, for this reason, this reversal cannot be made as rapidly as possible. Accordingly, it is further advantageous to already reduce the gradient in advance of reaching the maximum rpm, that is, to make the gradient dependent from the engine rpm.

An influence of driver characteristics, for example, a preferred sporty and economical way of driving can be considered advantageously with the aid of a characteristic field, which supplies the gradient as an output quantity. Here, the gradient is, as a rule, increased when a sporty acceleration performance is wanted.

Overall, it is therefore possible to match the transmission ratio of a continuously variable transmission comfortably and yet dynamically to the desire of the driver in dependence upon the above-mentioned influence quantities.

The transmission ratio adjustment in the positive direction as well as in the negative direction can be adapted to the particular peripheral parameters during the shifting operation by inputting suitable combinations of the above-mentioned influence quantities.

BRIEF DESCRIPTION OF THE DRAWINGS

The invention will now be described with reference to the drawings wherein.

DESCRIPTION OF THE PREFERRED EMBODIMENTS OF THE INVENTION

In the method described in the following, an adjusting speed $v_u$ for a change of an actual transmission ratio (u) into a steady-state desired transmission ratio $u_{state}$ shift operation) is controlled with the aid of a control apparatus in a continuously variable transmission arranged in the operating train of a motor vehicle. For this purpose, procedures are stored in a digitalized form in the control apparatus and these procedures function, in a manner known per se, for inputting positioning quantities for actuator elements assigned to the transmission. The control apparatus can be integrated into an engine control apparatus already available or can be realized as an independent control unit.

Figure 1:
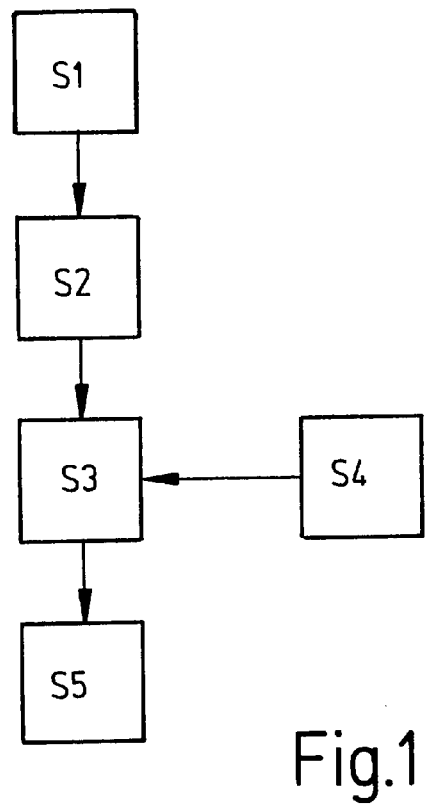
FIG. 1 is a sequence diagram for the control of an adjusting speed during a shifting operation in an automatic continuously variable transmission.

FIG. 1 shows a sequence diagram with which the determination of the adjusting speed $v_u$ in accordance with the invention will be explained. In step S1, a need is detected as to whether a change of the actual transmission ratio (u) should be carried out. If the need for a change of the transmission ratio is present, that is, if a desired transmission ratio $u_{stat}$, which is to be adjusted, is present, then the shifting operation is first subdivided into individual periods dT of fixed duration. If a difference $u_{diff}$ between the actual transmission ratio (u) and the steady-state desired transmission ratio $u_{stat}$ is small, then the shifting operation can, under certain circumstances, be terminated within a single period dT. For large differences $u_{diff}$, the inquiry, which is to be described hereinafter, is run through (n) times corresponding to a number (n) of the determined periods dT.

In the following, for each period dT, a dynamic desired transmission ratio $u_{dyn}$ is determined (step S3) by multiplying the steady-state desired transmission ratio $u_{stat}$ by a gradient $U_{dot}$. The gradient $u_{dot}$ is itself, in turn, dependent upon numerous influence quantities which are more carefully explained (step S4) in the following.

After the determination of the dynamic desired transmission ratio $u_{dyn}$, the adjusting speed $v_u$ for the particular period dT is fixed at a constant value so that, at the start of the period dT, the actual transmission ratio (u) and, at the end of the period dT, the dynamic desired transmission ratio $u_{dyn}$ is present.

Figure 2:
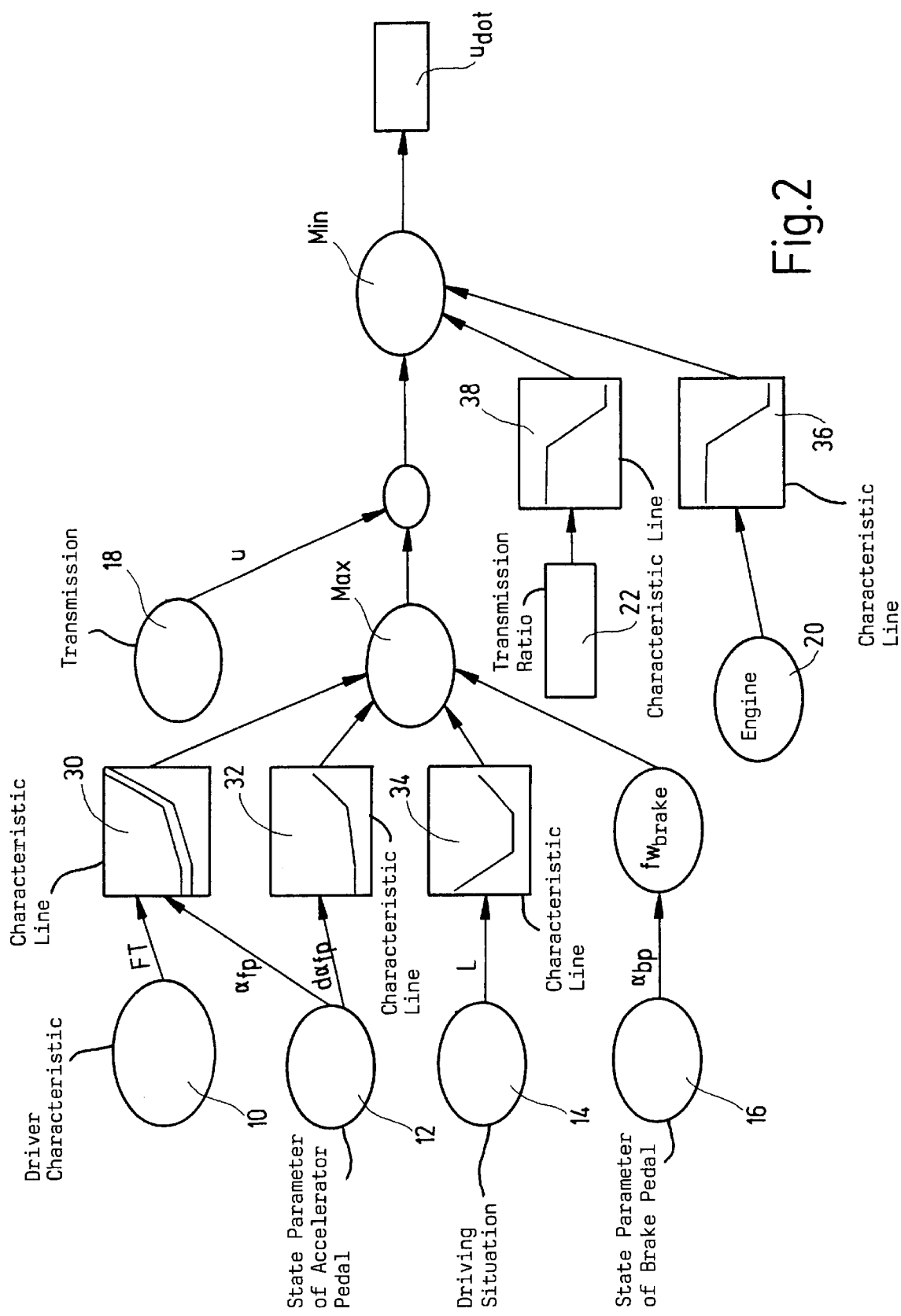
FIG. 2 is a circuit diagram of different influence quantities for the control of the adjusting speed; and, FIG. 3 shows traces of the adjusting speed during a shift operation as a function of time in accordance with the method of the invention (dotted line) in accordance with a conventional method (dash line) and without a control of the adjusting speed (solid line).

In FIG. 2, some influence quantities are shown which are important in the determination of the gradient $u_{dot}$ for a change of the transmission ratio in a positive direction. It has been shown to be advantageous to first determine a maximum MAX from respective gradients $u_{dot}$ which are determined in dependence upon various influence quantities. These influence quantities are here a driver characteristic 10, a parameter of an accelerator pedal 12, a driving situation 14 and/or a parameter of a brake pedal 16. Subsequently, the maximum MAX is weighted with the transmission ratio (u) transmitted by the transmission 18. This value is provided with an upper limit in that an influence of the engine 20 and/or of the transmission ratio 22 is considered by, fixing a minimum MIN. For the case not shown here of a change of the actual transmission ratio (u) into a steady-state transmission ratio $u_{stat}$ in the negative direction, the influence quantities shown can be applied in a manner different herefrom to determine the gradient $u_{dot}$. Thus it is, for example, conceivable to input a fixed value, especially zero, when the brake 16 is actuated so that the shifting operation can even be interrupted.

The influence of the driver characteristic 1 can, for example, be considered by inputting a driver type FT. Here, access can be made to hardware and software already installed in the vehicle for detecting the type of driver FT, for example, in the form of a selection switch, a selection lever or a suitable software. From this selection 3 drives, who is recognized as sporty, can, for example, be permitted a higher gradient $U_{dot}$ than a driver who is recognized as being economical. The dependency can be so realized that, based on a characteristic line 30, which additionally considers an accelerator pedal position $\alpha_{fp}$, a gradient $u_{dot}$ is pregiven. The dependency of the characteristic line 30 from the accelerator pedal position $\alpha_{fp}$ can be advantageously configured such that, for example, for a low accelerator pedal position $\alpha_{fp}$, only a small value is, read out for the gradient $u_{dot}$.

If, in contrast, the accelerator pedal position $\alpha_{fp}$ is high, then a rapid adjustment of the transmission ratio in a positive direction is generally wanted. If the vehicle has a kickdown switch, then it can be especially provided to permit an especially high gradient $U_{dot}$ when actuating the switch.

Furthermore, an input of $u_{dot}$ can be realized with the aid of a characteristic line 32 for a change of the accelerator pedal position $d\alpha_{fp}$. For this purpose, the gradient $d\alpha_{fp}$ is determined in a manner known per se and must be held constant over a certain time span.

If the accelerator pedal 12 is depressed from the value $hfP_1$ to a higher value $hfp_2$ in a time Δt and is then held constant, then an accelerator pedal gradient $d\alpha_{fp}$ is present only during the time Δt but not outside of thaws time. If, however, after the time Δt, the gradient $u_{dot}$ of the transmission ratio adjustment still is to be dependent upon this accelerator pedal gradient $d\alpha_{fp}$, then this gradient must be suitably-stored and this can take place within the control apparatus in a manner known per se. For a low positive accelerator pedal gradient $d\alpha_{fp}$, it has been shown to be advantageous to permit only a low value for the gradient $u_{dot}$, that is, for the adjustment of the transmission 18 in a positive direction. For a high accelerator pedal gradient $d\alpha_{fp}$, it can be provided to adjust the transmission 18 faster in the positive direction. Likewise, for a high negative pedal gradient $d\alpha_{fp}$ (that is, when the driver rapidly takes the foot from the accelerator pedal 12 (fast-off)), only a low gradient $u_{dot}$ can be permitted in the negative direction. In this way, the transmission ratio is virtually held constant and for a renewed depression of accelerator pedal by the driver, the vehicle travels on with an almost unchanged transmission ratio.

In order to quantify the influence of the driving situation 14, a total running resistance L is first determined. Here, reference can be made to known recognition methods which make, for example, possible the detection of an uphill travel or a downhill travel. The relative total running resistance L is, for example, described as a continuous quantity between −1 and +1 wherein the value −1 corresponds to a travel down a steep hill, the value 0 corresponds to a travel through a plane and the value +1 corresponds to a steep uphill travel. In this way, an association of a gradient $u_{dot}$ can be made possible with the aid of the above value via a characteristic line 34. For a recognized increased total running resistance (that is, uphill) and likewise for a detected reduced total running resistance (that is, downhill), it has been shown to be advantageous to increase the quantity $u_{dot}$. In this way, the total running resistance, which deviates in such travel situations 14, can be considered by increasing an engine rpm (n).

The position $\alpha_{bp}$ of the brake pedal 16 can likewise serve as an input for a maximum gradient $u_{dot}$. In order to achieve the situation that, when braking the vehicle to standstill, the vehicle comes to standstill in the start transmission ratio, it is advantageous, for an actuated brake, to permit a high gradient $u_{dot}$ for the transmission ratio adjustment in the positive direction. This can, for example, take place in such a manner that, for an actuated brake, a fixed value $fw_{brake}$ is pregiven for the gradient $u_{dot}$. It can furthermore be advantageous that, for an actuated brake, no transmission ratio adjustment is permitted in the negative direction. Such a measure supports, on the one hand, the braking up to standstill so that a high transmission ratio once reached is not again reduced and, on the other hand, in the same manner as the performance for a high negative accelerator pedal gradient $d\alpha_{fp}$ (fast-off), the transmission ratio is held at a higher value when the driver again wants acceleration.

In summary, a maximum MAX is therefore first formed from the above-mentioned influence quantities which is then weighted with the actual transmission ratio (u). A weighting is especially advantageous because, in this way, a dependency of the gradient $u_{dot}$ on the engine rpm (n) can, for the most part, be compensated. In a manner known per se, the change of the engine rpm (n) is inversely proportional to the transmission ratio (u), that is, for a low transmission ratio (u), a specific gradient $u_{dot}$ effects a greater change of the engine rpm (n) than the same gradient $u_{dot}$ for a larger transmission ratio (u). This influence can be eliminated by weighting.

If the transmission ratio (u) of the transmission 18 is intended to increase, for example, as a reaction to a strong accelerator pedal actuation, then attention should be given to the fact that the engine rpm (n) does not increase above a maximum rpm for this engine 20. In accordance with this, the necessity in present to interrupt the transmission ratio adjustment in the positive direction or to reverse the same into the negative direction before reaching the maximum rpm. However, the reversal is not possible as rapidly as wanted because the transmission 18 is a relatively sluggish system. For this reason, it is advantageous to permit only a small gradient $u_{dot}$ in the positive direction clearly in advance of reaching the maximum rpm. For this purpose, for example, a characteristic line 36 can pregive a maximum value for $u_{dot}$ as a function of the engine rpm (n).

Likewise, an influence of the transmission ratios 22 must be included witn the determination of the gradient $u_{dot}$, that is, a difference $u_{diff,dyn}$ between the steady-state transmission ratio $u_{stat}$ and the dynamic transmission ratio $u_{dyn}$. Especially for an intense actuation of the accelerator pedal, the dynamic desired transmission ratio $u_{dyn}$ follows with a pregiven gradient. However, if, when reaching the steady-state desired transmission ratio $u_{stat}$, the transmission gradient $u_{dot}$ suddenly reaches the value 0 (because the transmission 18 should now no longer be adjusted), this leads to an uncomfortable driving behavior. For this reason, it is advantageous, when $u_{stat}$ and $u_{dyn}$ approach each other, to permit only a slight positive transmission ratio gradient $u_{dot}$. This can, for example, be realized in such a way that a characteristic line 38 inputs a maximum positive gradient $u_{dot}$ as a function of the difference $u_{diff,dyn}$.

Figure 3:
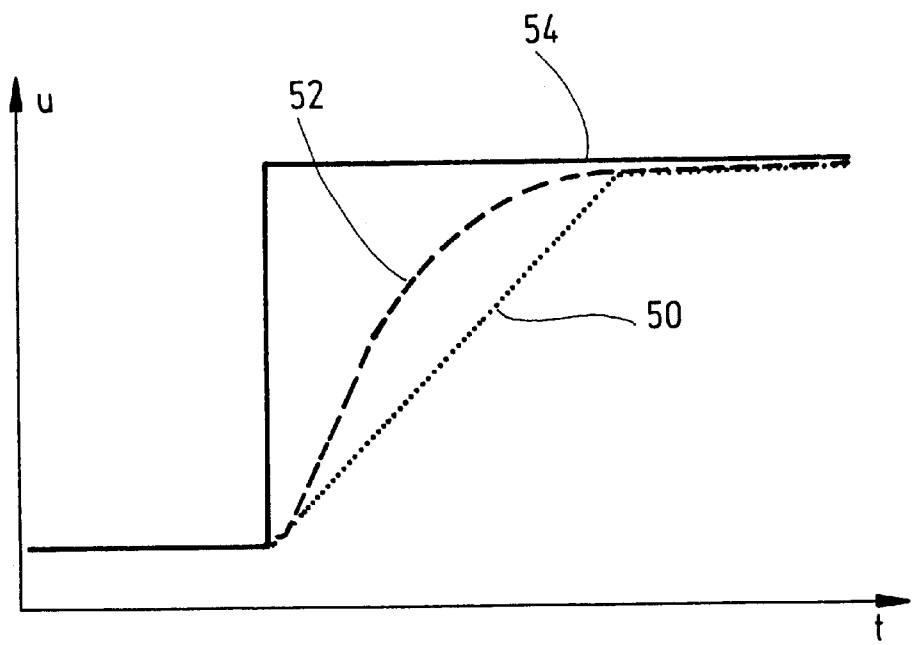

In FIG. 3, the trace 50 of the adjusting speed $v_u$ is changed in accordance with the method of the invention. From FIG. 3, the trace 50 can be recognized compared to, for example, a conventional method represented, for example, by U.S. Pat. No. 5,860,891 (trace 52).

Furthermore, a trace 54 is shown for an uncontrolled shifting operation. It can be seen that, in lieu of an exponential increase or even an almost perpendicular increase of the transmission ratio, a linear increase can be realized with the aid of the method of the invention which leads to a significantly more comfortable configuration of the shifting operation.

It is understood that the foregoing description is that of the preferred embodiments of the invention and that various changes and modifications may be made thereto without departing from the spirit and scope of the invention as defined in the appended claims.

What is claimed is:

1. A method for controlling an adjusting speed for a change of an actual transmission ratio (u) into a steady-state desired transmission ratio ($u_{stat}$) (shift operation) for a continuously variable transmission, the method comprising the steps of:

subdividing the shift operation into individual periods (dT) of fixed duration;

during each period, determining a dynamic desired transmission ratio ($u_{dyn}$) by multiplying said steady-state desired transmission ratio ($u_{stat}$) by a gradient ($u_{dot}$); and, causing the change from said actual transmission ratio (u) to said dynamic desired transmission ration ($u_{dyn}$) to take place at a constant adjusting speed ($v_u$) each period (dT).

2. The method of claim 1, wherein the gradient ($u_{dot}$) is fixed in dependence upon at least one influence quantity, the at least one influence quantity being one of an operating parameter of the motor vehicle and an operating parameter of said transmission.

3. The method of claim 2, wherein the influence quantity is a position ($d\alpha_{fp}$) of an accelerator pedal or a change of said position ($d\alpha_{fp}$) of said accelerator pedal.

4. The method of claim 2, wherein the influence quantity is a driving situation in the form of an actual total running resistance (L).

5. The method of claim 2, wherein the influence quantity is a position ($\alpha_{bp}$) of a brake pedal.

6. The method of claim 2, wherein the influence quantity is said actual transmission ratio (u).

7. The method of claim 2, wherein the influence quantity is an engine rpm (n).

8. The method of claim 2, wherein the influence quantity is a difference ($u_{diff,dyn}$) between the dynamic transmission ratio ($u_{dyn}$) and the steady-state transmission ratio ($u_{stat}$).

9. The method of claim 2, wherein the influence quantity is driver characteristic (FT).

10. The method of claim 2, wherein the influence quantity is a shift direction of the transmission ratio adjustment in the negative or positive direction.

11. An arrangement for controlling an adjusting speed for a change of an actual transmission ratio (u) into a steady-state desired transmission ratio ($u_{stat}$) (shift operation) for a continuously variable transmission, the arrangement comprising:

means functioning to do the following:

subdivide the shift operation into individual periods (dT) of fixed duration;

during each period (dT), determine a dynamic desired transmission ratio ($u_{dyn}$) by multiplying said steady-state desired lo transmission ratio ($u_{stat}$) by a gradient ($u_{dot}$); and, cause the change from said actual transmission ratio (u) to said dynamic desired transmission ratio ($u_{dyn}$) to fake place at a constant adjusting speed ($v_u$) during each period (dT).

12. The arrangement of claim 11, said means including a control apparatus wherein a procedure for controlling the adjusting speed is stored.

13. The arrangement of claim 12, wherein said control apparatus is part of an engine control apparatus.

* * * * *

UNITED STATES PATENT AND TRADEMARK OFFICE
CERTIFICATE OF CORRECTION

PATENT NO.     : 6,575,871 B2
DATED          : June 10, 2003
INVENTOR(S)    : Juergen Loeffler et al.

It is certified that error appears in the above-identified patent and that said Letters Patent is hereby corrected as shown below:

Column 6,
Line 32, delete "ration" and substitute -- ratio -- therefor.
Line 41, delete "$(d\alpha_{fp})$" and substitute -- $(\alpha_{fp})$ -- therefor.
Line 56, insert -- a -- between "is" and "driver".

Column 7,
Line 7, delete "fake" and substitute -- take -- therefor.

Signed and Sealed this

Twenty-fifth Day of November, 2003

JAMES E. ROGAN
*Director of the United States Patent and Trademark Office*